United States Patent [19]
Robertson

[11] 3,838,868
[45] Oct. 1, 1974

[54] EXTENDABLE TRAILER MECHANISM
[75] Inventor: Paul E. Robertson, Houston, Tex.
[73] Assignee: Western Lines, Inc., Houston, Tex. ; a part interest
[22] Filed: Aug. 13, 1973
[21] Appl. No.: 388,335

[52] U.S. Cl. ............................ 280/34 A, 280/81 R
[51] Int. Cl. ............................................ B62d 21/14
[58] Field of Search ............... 280/34 A, 81 R, 34 R

[56] References Cited
UNITED STATES PATENTS
| | | | |
|---|---|---|---|
| 2,657,939 | 11/1953 | Beebe | 280/34 A X |
| 2,812,088 | 11/1957 | Cadillac et al. | 280/34 A X |
| 3,183,017 | 5/1965 | Lundquist | 280/34 R |
| 3,239,274 | 3/1966 | Weiss | 280/34 A |

Primary Examiner—M. Henson Wood, Jr.
Assistant Examiner—John J. Love

[57] ABSTRACT

An extendable trailer mechanism adapted to be towed by a tractor on a roadway and being extendable to efficiently accommodate loads of varying length. The trailer mechanism may include front and rear chassis means that are disposed in telescoping relation, each of which chassis means may be supported by separate wheel and axle assemblies that may be disposed in juxtaposed relation in the contracted condition of the trailer mechanism and may be disposed in spaced relation in the extended condition of the trailer mechanism. The front and rear chassis cooperate in such manner that the chassis are disposed in substantially rigid relation when the trailer mechanism is contracted and allowed articulation of the chassis structures about a generally horizontal axis when the trailer mechanism is extended. Locking devices are provided to secure the front and rear chassis structures in assembly in both the contracted and extended condition of the trailer mechanism.

12 Claims, 8 Drawing Figures

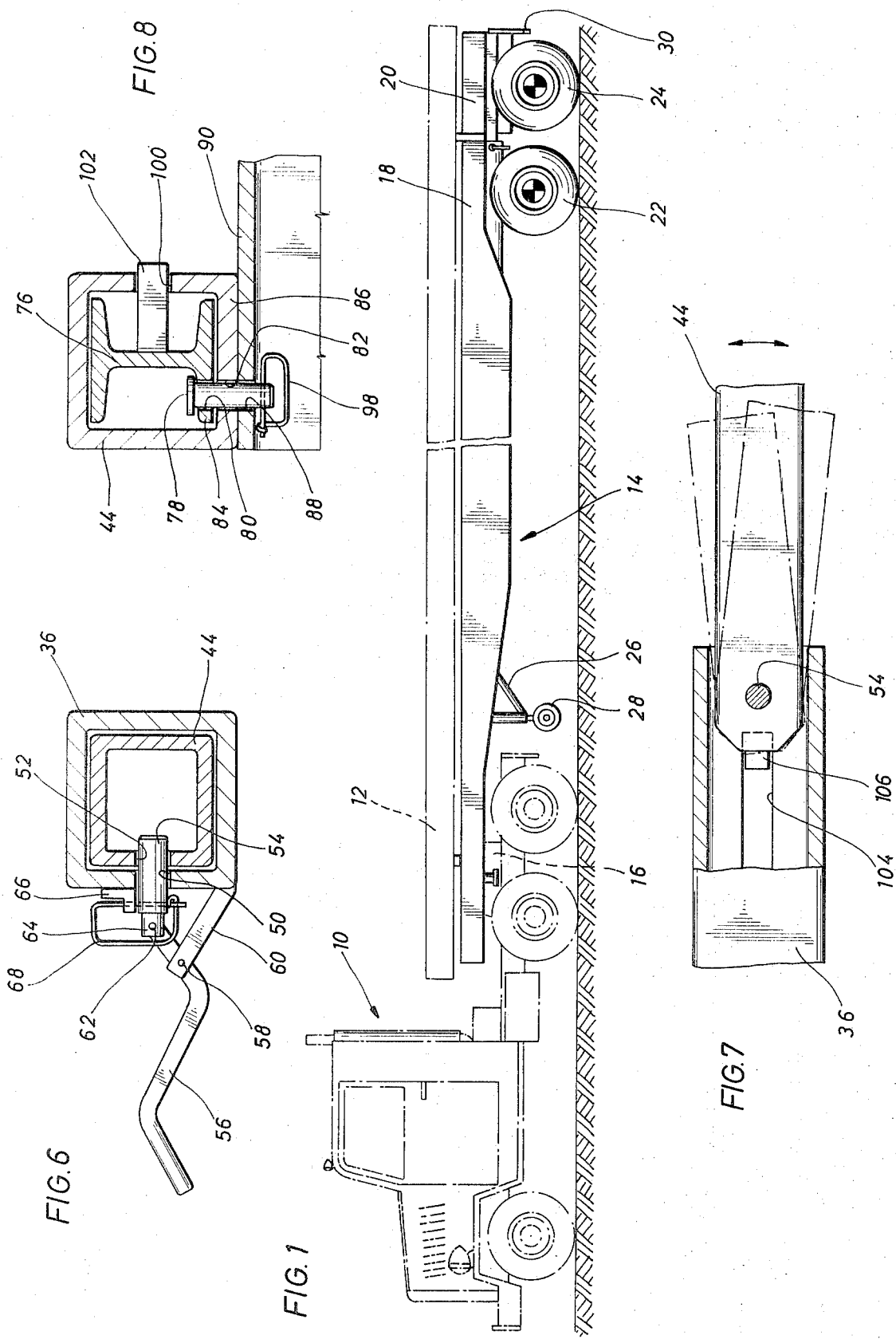

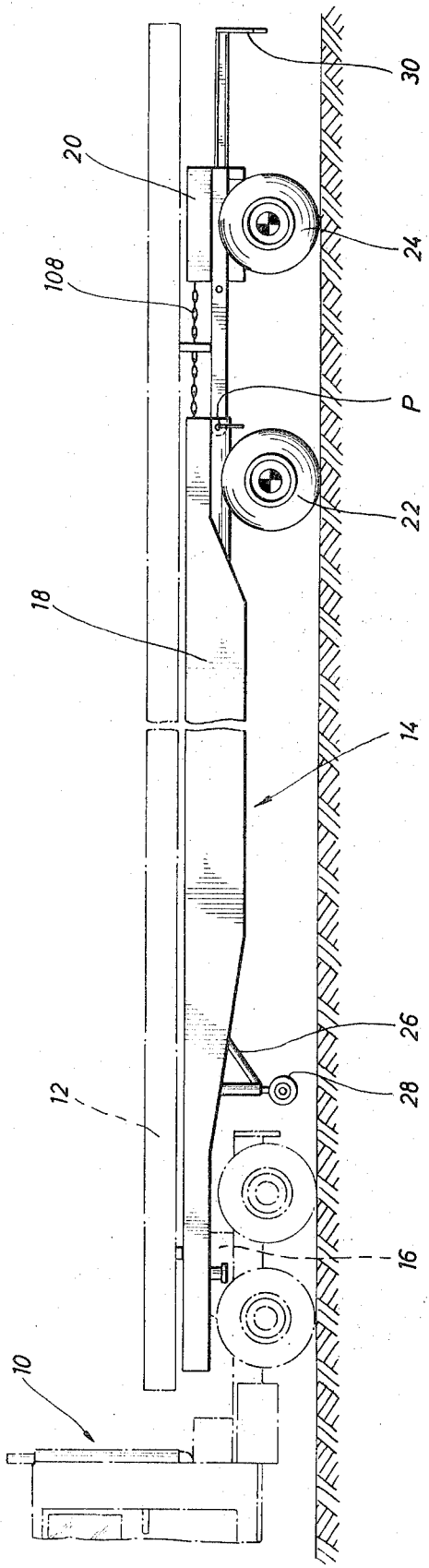

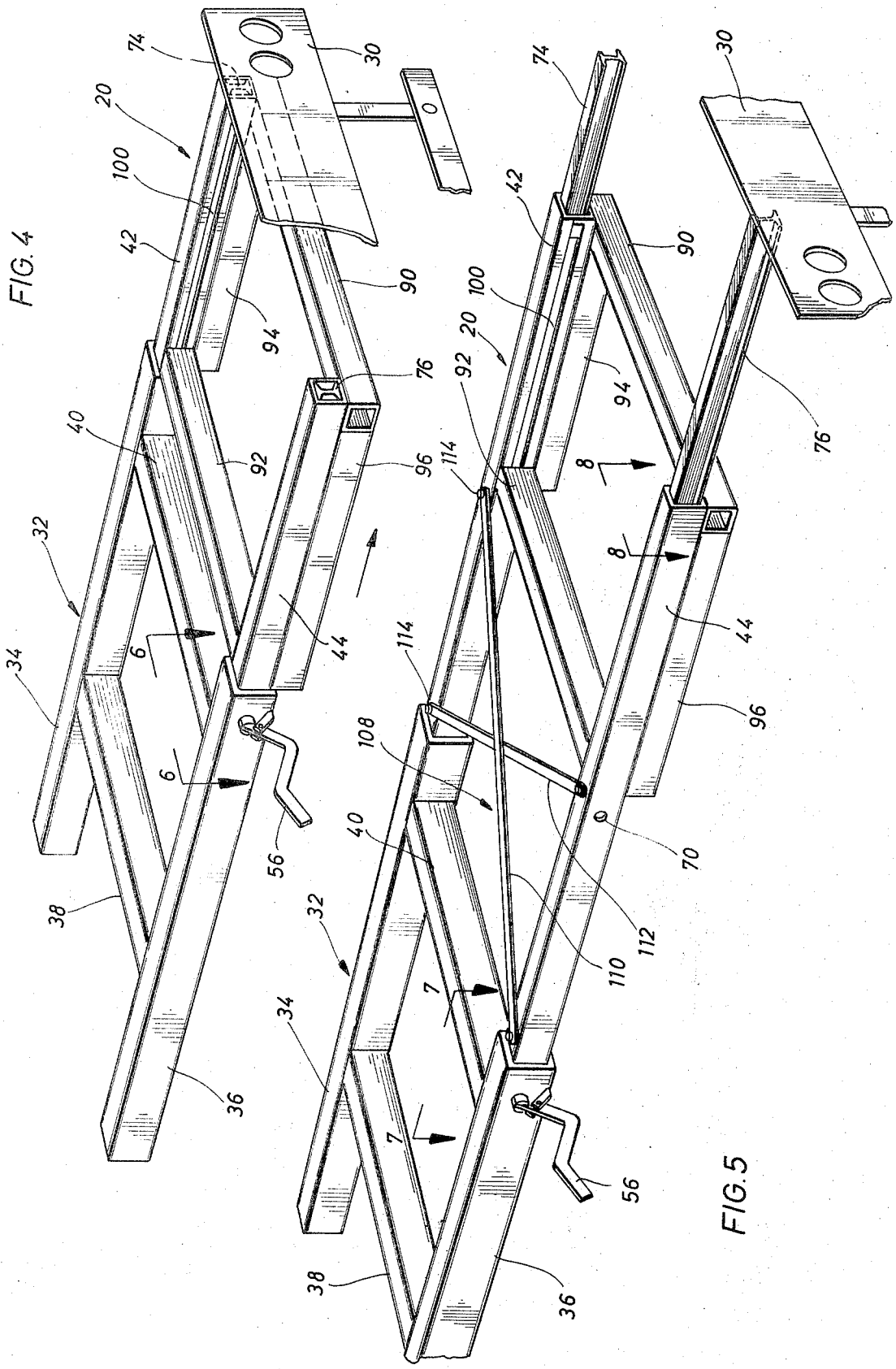

EXTENDABLE TRAILER MECHANISM

FIELD OF THE INVENTION

This invention relates generally to trailers that are adapted to be towed by tractor mechanisms over roadways and particularly to trailer mechanisms that are adapted to haul loads that may be extremely long. More specifically, the invention is directed to trailer mechanisms that are of variable length to accommodate extremely long loads and which are also constructed to prevent undue stressing of the trailer mechanism by changes in grade of the roadways over which the trailer mechanism may be towed.

BACKGROUND OF THE INVENTION

It is frequently desirable to transport long objects over roadways and, where objects are of sufficient length to exceed the length capability of a particular trailer adapted to be towed by a tractor mechanism, it is typically necessary for a special permit to be obtained for such transportation. Obtaining of a special permit for transportation of oversize or overlength shipments typically requires a substantial amount of time and expense. Also, it may be necessary for the oversize or overlength load to be escorted by law enforcement personnel having control of the particular roadway involved. This is also undesirable and typically expensive.

Where overlength loads are to be transported by truck and trailer assemblies over roadways, and the loads are of flexible nature, it is typically necessary to contract for transportation by specially designed vehicles, which, of course, increases the cost of transportation and typically renders it commercially unfeasible. The bridging laws, enforced by many states, create another problem, because such laws typically require a certain minimum spacing between the front and rear wheels of a truck and trailer assembly and impose other requirements which make it desirable to facilitate adjustment of at least a part of the rear wheel assembly of the trailer in order to support extremely long loads and yet conform to the particular bridging laws under enforcement in the area of operation.

Accordingly, it is a primary object of the present invention to provide a novel extendable trailer mechanism for a truck and trailer assembly having separable front and rear chassis assemblies each being supported by a wheel and axle assembly, wherein the rear chassis may be extended from the front chassis to extend the overall length of the trailer assembly.

It is another object of the present invention to provide a novel extendable trailer mechanism, wherein front and rear chassis assemblies are provided having extension means that are disposed in telescoping relation and are adapted to be utilized in both contracted and extended positions for transporting loads of various lengths.

Another specific feature of the present invention involves the provision of an extendable trailer mechanism having front and rear chassis assemblies that are disposed in rigid relation in the contracted condition thereof and are disposed in articulated relation about a generally horizontal axis in the extended condition thereof, to compensate for changes in grade of the roadway over which the trailer mechanism is towed.

Among the several objects of the present invention is contemplated the provision of a novel extendable trailer mechanism having front and rear telescopically related chassis assemblies and including locking means that positively secures the front and rear chassis structures in assembly in both the contracted and the extended conditions of the trailer mechanism.

Another feature of the present invention involves the provision of an extendable trailer mechanism having an extendable bumper assembly carried thereby, which bumper assembly may be readily extended from the rear portion of the trailer mechanism to any desirable length, depending upon the load to be transported.

It is also an important object of the present invention to provide an extension mechanism for trailers which may be readily added by simple and low cost assembly to existing standard trailer mechanisms to adapt such standard trailer mechanisms for transportation of loads of excessive length.

It is also a further object of the present invention to provide a novel extendable trailer mechanism that is of simple nature, is reliable in use and low in cost.

Other and further objects, advantages and features of the present invention will become apparent to one skilled in the art upon consideration of the written specification the appended claims and the annexed drawings. The form of the invention, which will now be described in detail, illustrates the general principles of the invention, but it is to be understood that this detailed description is not to be taken as limiting the scope of the present invention.

SUMMARY OF THE INVENTION

In accordance with the present invention a trailer mechanism may be provided having a front chassis structure including generally parallel longitudinal support elements of tubular configuration. A rear chassis structure, supported by a wheel and axle assembly, may be provided with extension elements that are received in telescoping relation within the tubular longitudinal support elements of the front chassis structure, thereby allowing the rear chassis structure to be disposed in close assembled relation with the front chassis structure or extended to a considerable distance from the front chassis structure, depending upon the particular load that is to be transported. A locking means, such as locking pins, actuated by a lever carried by one or both of the chassis structures, as desired, may be utilized to secure the extension elements in assembly with the longitudinal support elements. The extension elements and the longitudinal support elements are so related that, when in telescoped relation, in the contracted condition of the trailer mechanism, the front and rear chassis structures are disposed in substantially rigid relation while, in the extended condition of the trailer mechanism the front and rear chassis structures are disposed in articulated relation. Articulated movement of the chassis structures is possible because of pivotal movement between the extension members and the longitudinal support elements, which allows the trailer mechanism to compensate for abrupt changes in grade of the roadway, thus preventing undue stressing of the trailer mechanism.

The trailer mechanism may also be provided with an extendable bumper mechanism that may be adjustably positioned relative to the rear chassis structure, thereby further lengthening the overall trailer assembly and conforming to laws relating to allowable load overhang.

BRIEF DESCRIPTION OF THE DRAWINGS

So that the manner in which the above recited features, advantages and objects of the present invention, as well as others, which will become apparent, are attained and can be understood in detail, more particular description of the invention, breifly summarized above, may be had by reference to the embodiment thereof which is illustrated in the appended drawings, which drawings form a part of this specification.

It is to be noted however, that the appended drawings illustrate only a typical embodiment of the invention and are therefore not to be considered as limiting of its scope, for the invention may admit to other equally effective embodiments.

IN THE DRAWINGS

FIG. 1 is a side elevational view of a tractor and trailer assembly, the trailer assembly being constructed in accordance with the present invention.

FIG. 2 is a side elevational view of a portion of the truck and the entire trailer assembly, showing the trailer assembly in the extended position thereof.

FIG. 3 is a side elevational view similar to that of FIG. 2, illustrating the articulated relationship between the rear chassis structure and the front chassis structure of the trailer assembly.

FIG. 4 is an isometric view of a portion of the framework of the trailer mechanism of the present invention illustrating the telescoping relationship between the front and rear chassis structure of the trailer mechanism and also illustrating the telexcoping relationship of the bumper assembly to the rear chassis structure.

FIG. 5 is an isometric view similar to that of FIG. 4 and illustrating the various parts of the trailer and bumper extension mechanisms in the extended position thereof.

FIG. 6 is a sectional view taken along line 6—6 in FIG. 5 and illustrating the locking pin and locking pin actuating mechanism of the invention in detail.

FIG. 7 is a fragmentary sectional view taken along 7—7 in FIG. 5 and illustrating the articulated relationship between the tubular elements and extension elements of the present invention, together with means for preventing inadvertent separation of the extension elements from the tubular elements.

FIG. 8 is a sectional view taken along line 8—8 in FIG. 5 and illustrating in detail the mechanism for locking the bumper structure in any adjusted position thereof and for preventing inadvertent separation of the bumper assembly from the rear chassis structure of the trailer mechanism.

DESCRIPTION OF THE PREFERRED EMBODIMENT

With reference now to the drawings and first to FIG. 1, a tractor device is illustrated in broken line, generally at 10, that is of a type typically employed in providing the motive power for transportation of a tractor and trailer assembly over a roadway for transporting various loads. A long load is shown in broken line at 12, which load may be representative of any load of long material that might be transported. For example, it is typically desirable to transport long pipes or tubing sections such as might be employed in oil field well drilling operations and to transport long bars of reinforcing metal, such as might be utilized for reinforcing concrete and the like. The load may also take the form of beams utilized in construction of buildings, etc.

For transporting long loads in accordance with the present invention, a trailer mechanism, illustrated generally at 14, may be employed that is adapted to be connected to the tractor vehicle 10 by means of a fifth wheel structure, illustrated in broken line at 16. The trailer mechanism may include front and rear chassis assemblies 18 and 20 respectively, each being supported by separate wheel and axle assemblies 22 and 24, respectively. The front end of the trailer mechanism, when not connected to the fifth wheel assembly of the tractor vehicle, may be supported by an auxiliary support structure 26 that may have small wheels 28, thereby allowing the trailer mechanism to be moved while it is not supported by the tractor vehicle. The auxiliary support may be pivotally connected to the trailer in such manner that it may be raised mechanically, if desired.

The rear chassis assembly 20, as shown in FIG. 2, may be extended from the front chassis assembly 18, thereby increasing the overall length of the trailer mechanism by a considerable extent and allowing the trailer mechanism to accommodate loads of greater length and yet conforming the trailer mechanism to the bridging and overlength laws of most states of the Unites States. A bumper assembly 30 may also be adjustably disposed relative to the rear chassis 20, thereby enabling the bumper assembly to be extended in the manner illustrated in FIG. 2 to further increase the overall length of the trailer mechanism in order to provide a bumper structure at more nearly the trailing extremity of the trailer.

It is typically necessary to provide for articulation between the tractor and a trailer assembly towed thereby, in order to prevent excessive strain from developing in the tractor or trailer structure while transportation is taking place over a roadway of changing grade. In the typical tractor and trailer assembly, the fifth wheel mechanism 16 provides the degree of articulation that is necessary. Although articulation of one rear axle assemble of a trailer mechanism to the other is not typically necessary, when a rear wheel assembly of a trailer is extended a substantial distance from another rear wheel assembly, it may be desirable to provide for articulation of the trailer assembly about a horizontal axis. According to the present invention, such articulation may be conveniently provided by a pivotal connection that is established between connector elements of the front and rear chassis assemblies of the trailer mechanism defining the present invention. As shown in FIG. 3, the rear chassis assembly 20 is connected to the front chassis assembly at a pivot point P that allows articulation about a generally horizontal axis defining the pivot point. As an abrupt grade change takes place, such as by towing the trailer mechanism over a railroad grade corssing, the rear chassis assembly will pivot upwardly or downwardly from a normal position about a horizontal axis defined by the pivot point P and the trailer structure will not be overstressed in any manner.

With reference now to FIGS. 4 and 5, the front chassis structure of the trailer mechanism may include an extension adapter structure, illustrated generally at 32, which may be affixed to the undercarriage of the trailer chassis in any desirable manner, such as by welding, bolting or the like. If desirable, the extension adapter element 32 may be incorporated into the chassis structure of the trailer mechanism. If a conventional trailer mechanism is modified to allow extension thereof in accordance with the teachings of this invention, it will be desirable to weld or bolt an extension adapter 32 to the underside of the rear portion of the trailer chassis, after suitable modification is made to accommodate the same.

The extension adapter 32 may incorporate a pair of generally parallel tubular elements 34 and 36 that may be reinforced by transverse structural elements 38 and 40 which are secured by welding or by any other desirable means to the parallel tubular elements. Although the tubular elements are shown to be of closed generally rectangular configuration in the drawings of the present invention, it is not intended to limit the present invention solely to parallel tubular elements that are completely closed, it being obvious that structural elements of other desirable configuration may be employed within the spirit or scope of the present invention.

The rear chassis structure 20 of the trailer mechanism may incorporate a pair of elongated extension elements 42 and 44 that may be maintained in parallel relation by transverse support elements 46 and 48 that may be welded thereto or may be secured in assembly therewith by any other desirable means of connection. The transverse extension elements 42 and 44 may be receivable in telescoping relation within the tubular elements 34 and 36, respectively, thereby allowing the framework or chassis 20 to be linearly movable relative to the front chassis 18 of the trailer mechanism.

It will be desirable to provide a suitable means for positively connecting the first and second chassis portions of the trailer mechanism in assembly in both the contracted and extended conditions of the trailer mechanism. In accordance with the present invention, one suitable means of connection may conveniently take the form of locking pin means which extend through appropriate apertures formed in the structural elements which pin means secure structural elements in positive assembly. With reference to FIG. 6 a locking aperture 50 is shown to be formed in the tubular element 36 while a corresponding aperture 52 may be formed in the extension member 44. A locking pin 54 may be extended through the aligned apertures 50 and 52 to secure the structural elements 36 and 44 in positive assembly. A pin actuating lever 56 may be secured by a pivot 58 to an actuating arm support 60 affixed by welding or the like to tubular element 36 and a pivot 62 may establish connection between the free extremity of the actuating arm 56 and a connector tab 64 affixed in any suitable manner to the locking pin 54. The actuating arm 56 may be rotated about its pivot 58 in order to extract the pin 54 from the aligned apertures 50 and 52. In order to lock the pin 54 in the position illustrated in FIG. 6, a locking tab 66 may be secured to the wall structure of the tubular element 36 and may have an aperture formed therein through which may extend a portion of a locking clevis 68 that also extends through an aperture formed in the locking pin 54 to secure the locking pin to the tab 66. A similar locking pin and locking pin actuator assembly may be disposed in assembly with the opposite tubular element 34 in order to lock the tubular element and the extension elements 42 in assembly as desired.

As the trailer mechanism is towed over a roadway and the grade of the roadway changes abruptly, it is desirable to provide a means for establishing an articulated connection between the front and rear chassis structures of the trailer to prevent the trailer from being overstressed by bending movement. In accordance with the present invention an articulated connection may be established when the rear chassis structure 20 is extended from the front chassis structure in the manner illustrated in FIG. 7 of the drawings, where the tubular elements 36 are shown to be of sufficiently greater dimension than the exterior dimension of the extension elements 44 that the extension elements are allowed a limited amount of pivotal movement about the pivot point defined by the connector pin 54. As shown in broken lines in FIG. 7, the extension element 44 may be pivoted upwardly or downwardly from a neutral position, shown in full line, thereby allowing articulation of the trailer mechanism about a generally horizontally disposed axis defined by the pivot pins 54. When the extension elements 42 and 44 are fully telescopically received within the tubular elements 34 and 36, in the contracted condition of the trailer mechanism, as shown in FIGS. 1 and 4, the tubular elements, because of the length of the telescoping relationship, will prevent any articulation and the front and rear chassis structures will be disposed in substantially rigid relation. The locking pins 54 may be manipulated in suitable manner to cause the pins to enter the locking aperture 70, thereby positively securing the front and rear chassis structures in positive assembly in the contracted condition of the trailer mechanism.

It will also be desirable to provide a rear bumper mechanism for the trailer structure that may be extended from the rear chassis structure in order to conform to the load that is being transported by the trailer mechanism. As shown in FIGS. 2 and 3 and in detail in FIGS. 4, 5 and 8, the extension elements 42 and 44 are shown to be of generally tubular configuration and are adapted to receive a pair of generally parallel I-beam structures 74 and 76, respectively, having the bumper assembly 30 carried transversely thereby. The I-beams 74 and 76 may be adjustably positioned within the tubular extension elements 42 and 44 and may be positively secured thereto if desirable to facilitate proper relationship between the load being carried by the vehicle and the vehicle structure itself.

As shown in FIG. 8, the relationship between the tubular extension element 44 and the I-beam structure 76 is depicted with connection between the tubular extension element and the I-beam being accomplished by means of a locking pin 78 being received by apertures 80 and 82 formed, respectively, in the lower flange 84 of the I-beam 76 and the lower wall 86 of the tubular extension elements 44. An aperture 88 may also be formed in a transverse structural element 90 cooperating with transverse structural element 92 and longitudinal structural elements 94 and 96 to form a part of the rear chassis structure of the trailer mechanism. The pin 78 may also extend through the aperture 88 and may be retained in positively locked assembly with the chassis structure of the trailer mechanism by a clevis element 98. If desired, the lower flange 84 of the I-beam 76 may be provided with a number of spaced apertures, allowing the pin to be inserted through ones of the apertures in order to vary the degree of bumper extension that may be desired.

It may be desirable to positively prevent complete disassembly of the bumper mechanism from the tubular extension elements of the trailer chassis. If such is desired, elongated slots 100 may be formed longitudinally of the tubular extension elements, as shown in FIG. 5 for example, and a projection 102 may be welded or otherwise fixed to the I-beam structure 76 and may extend through the elongated slot 100. When the bumper mechanism is extended to its full length, the projection or stop 102 will engage the end of the slot 100, thereby preventing further movement. If the locking pins 78 should be left out or should become separated during transportation of the trailer, it will not be possible for the bumper mechanism to become completely separated by any means whatever. Likewise, elongated slots 104 may be defined in the tubular elements 34 and 36, in the manner illustrated in FIG. 7, that may stop short of the rear extremities of the tubular elements. Stop elements 106 may be fixed to the front extremities of the extension elements 42 and 44 and may extend through the slots 104. If, for any reason whatever, the locking pins 54 should be extracted from the apertures 50 and 52 of the tubular elements and the extension elements, respectively, the stop elements 106 will engage the rear extremities of the slots 104, thereby positively preventing further extension and possible disassembly of the rear chassis structure from the front chassis structure of the trailer.

As an alternative, to insure against complete disassembly of the rear chassis structure from the front chassis structure of the trailer, a flexible connector element 108 such as a chain, cable or the like may be connected both to the front chassis structure 18 and to the rear chassis structure. Connector element 108 will positively prevent disassembly either during transportation or while the trailer mechanism is being extended.

It may be desirable to provide the rear chassis extension mechanism with additional transverse support when in the fully extended position thereof. Accordingly, an X support, shown generally at 108 in FIG. 5 and comprising support elements 110 and 112 that may be welded together at the junction thereof, may be connected to the extension elements 42 and 44 by means of pins or bolts 114 that extend through suitable apertures formed in the extension elements. When it is desired to contract or shorten the length of the trailer mechanism, the X brace element 108 may be simply removed and stored in a few minutes time. If a load is being hauled that has very little transverse structural integrity, such as structural steel for concrete support, typically known as "rebar," the X brace element 108 will lend sufficient structural integrity to the trailer mechanism to prevent overstressing of the tubular extension elements 42 and 44 when the truck and trailer assembly is being sharply turned.

If it is desirable to modify a conventional truck trailer mechanism to facilitate extending the overall length thereof, it is simply necessary to weld or otherwise fix an extension frame element, such as shown generally at 32 in FIG. 4, to the underside of the rear portion of the conventional trailer mechanism. A wheel and axle assembly, supported by conventional air bags or any other suitable cushion support may then be connected to the rear frame structure in suitable manner. A rear chassis structure with appropriate extension elements then may simply be connected to the rear frame structure 32. Modification of an existing trailer mechanism to provide for extending the overall length thereof, may be readily and simply accomplished without resort to expensive modification of the conventional trailer mechanism.

OPERATION

Assuming it is desirable to transport a load of ordinary length by a trailer mechanism, a trailer mechanism of the present invention may be telescoped to its fully contracted position with the extension members 42 and 44 being fully received within the tubular elements 34 and 36 and with the locking pin structure 54 being inserted through the rear-most apertures 70 of the extension elements as well as the apertures 50 of the tubular elements, thereby locking the front and rear chassis structures of the trailer mechanism in substantially rigid and juxtaposed relationship. If it then becomes desirable to transport a load of exceptional length, the locking clevises may be removed and the pin actuating arms 56 may be pivoted about pivot 58, thereby retracting the pins 54 from locking relationship within the apertures 50 and 52 and releasing the extension elements from their pivotal connection with the tubular elements 36 and allowing the extension elements to move rearwardly to the position illustrated in FIGS. 2 and 3. After the rear chassis structure has been moved to the fully extended position thereof, the arm 56 may be pivoted in such manner as to insert the locking pins 54 through aligned apertures 50 and 70 thereby locking the tubular elements and the extension elements in the fully extended and articulated or pivotal condition thereof. As the trailer vehicle is towed over a roadway in the extended condition thereof, any change in grade of the roadway will merely cause articulation of the trailer mechanism and will not place the mechanical structure of the trailer under excessive strain.

The pins 78 may be removed from their locking positions relative to apertures 80, 82 and 88, after the locking clevis 98 has been removed from the aperture of the pin, thereby allowing the I-beam structures 76 to be free for extension relative to the rear chassis structure 20. After extension of the bumper mechanism, the pins 78 may be reinserted through appropriate aligned apertures, thereby locking the I-beam structures in positive assembly in proper relationship to the trailing extremity of the load being transported. The locking clevises 98 will be reinserted through the locking pins 78 after extension of the bumper, thereby preventing the bumper assembly from changing its extended relationship during transportation.

In view of the foregoing, it is apparent that the present invention provides a novel extendable trailer mechanism that is readily extendable from a contracted position for hauling loads of normal length to an extended condition for hauling loads of exceptional length and which will readily conform to the laws of most states, even though loads are transported that are overlength for standard trailers. The invention also provides a trailer mechanism including front and rear chassis structures which are disposed in substantially rigid relationship, in a contracted condition of the trailer mechanism, and are articulated about a generally horizontal axis in the extended condition of the trailer structure to prevent undue stressing of the mechanical parts of the trailer mechanism due to abrupt changes in grade of the roadway. The present invention also provides for simple and efficient extension of a bumper mechanism in order that the bumper may be properly disposed relative to the rear end of the load being transported. Another important feature provided by the invention is the facility for simple and efficient modification of conventional trailer mechanisms to provide for extension thereof without involving great expense. The invention, even though providing a transportation capability not ordinarily available, nevertheless is of quite inexpensive nature.

In view of the foregoing, it is apparent that the present invention is one well adapted to attain all of the objects hereinabove set forth, together with other advantages which will become obvious and inherent from the description of the apparatus itself. It will be understood that certain combinations and subcombinations are of utility and may be employed without reference to other features and subcombinations. As many possible embodiments may be made of the invention without departing from the spirit or scope thereof, it is to be understood that all matters hereinset forth or shown in the accompanying drawings are to be interpreted as illustrative and not in a limiting sense.

What is claimed is:

1. An extensible trailer mechanism adapted to be towed on a roadway by a tractor vehicle, said trailer mechanism comprising:
   first chassis means;
   a first wheel and axle assembly supporting said first chassis means;
   second chassis means having extension means carried thereby, said extension means being receivable in telescoping relation by said first chassis means in the contracted condition of said trailer mechanism and being extendable from said first chassis means to extend the length of said trailer mechanism;
   a second wheel and axle assembly supporting said second chassis means and being in juxtaposed relation with said first wheel and axle assembly in the contracted condition of said trailer mechanism and being disposed in spaced relation with said first wheel and axle assembly in the extended relation of said trailer mechanism; and
   means securing said second chassis means in pivotal relation to said first chassis means in the extended condition of said trailer mechanism and allowing articulation of said first and second chassis means about a generally horizontally disposed axis.

2. A trailer mechanism as recited in claim 1, wherein:
   said first and second chassis means are disposed in generally rigid relation in the contracted condition of said trailer mechanism.

3. A trailer mechanism as recited in claim 1, wherein:
   said means securing said second chassis means in pivotal relation with said first chassis means comprises pin means being extendable through said first and second chassis means.

4. A trailer mechanism as recited in claim 3, including:
   pin actuator means being carried by one of said chassis means and being connected to said pin means, said pin actuator means being movable between a locked position, where said pin means secure said first and second chassis means in assembly, and an unlocked position, where said pin means is retracted and said first and second chassis means are free for extending and contracting movement.

5. A trailer mechanism as recited in claim 4, wherein:
   said pin means secure said first and second chassis means in substantially rigid relation in the contracted relation thereof and secure said first and second chassis means in articulated relation in the extended relation thereof.

6. A trailer mechanism as recited in claim 1, wherein:
   said first and second chassis means are disposed in generally rigid relation in the contracted condition of said trailer mechanism and are disposed in said pivotal relation in the extended condition of said trailer mechanism.

7. A trailer mechanism as recited in claim 6, including:
   pin actuator means being carried by one of said chassis means and being connected to said pin means, said pin actuator means being movable between a locked position, where said pin means secures said first and second chassis means in assembly, and an unlocked position, where said pin means is retracted and said first and second chassis means are free for extending and contracting movement.

8. An extendable trailer mechanism adapted to be towed by a tractor on a roadway, said trailer mechanism comprising:
   first chassis means;
   a first wheel and axle assembly supporting said first chassis means;
   a second chassis means having extension means carried thereby, said extension means being receivable in telescoping relation by said first chassis means in the contracted condition of said trailer mechanism and being extendable from said first chassis means to extend the length of said trailer mechanism;
   a second wheel and axle assembly supporting said second chassis means and being in juxtaposed relation with said first wheel and axle assembly in the contracted condition of said trailer mechanism and being disposed in spaced relation with said first wheel and axle assembly in the extended relation of said trailer mechanism; and
   means securing said first and second chassis means in generally rigid relation in the contracted condition of said trailer mechanism and establishing a pivotal relation between said first and second chassis means in the extended condition of said trailer mechanism and allowing articulation of said first and second chassis means about a generally horizontally disposed axis.

9. An extendable trailer mechanism as recited in claim 8, wherein said first chassis means includes:
   a pair of generally tubular horizontal support elements disposed in generally parallel relation;
   said extension means of said second chassis means being telescopically receivable within said tubular elements;
   corresponding connector means being defined on both said tubular support elements and on said extension means and facilitating assembly of said first and second chassis means; and
   locking means being carried by some of said chassis means and being received in engagement with said connector means in both the extended and contracted conditions of said trailer mechanism for locking said chassis means in assembly.

10. An extendable trailer mechanism as recited in claim 9, wherein:

said corresponding connector means comprises a locking aperture disposed in said first chassis means and at least a pair of spaced locking apertures disposed in said second chassism means;

said locking means comprises locking pin means being movably supported by one of said chassis means and being receivable within said locking apertures of said first tubular support elements and said extension means; and lock actuating means being carried by one of said chassis means and being controllably connected to said locking pin means, said lock activating means, upon being moved, inducing selective locking and unlocking movement to said locking pin means.

11. An extendable trailer mechanism as recited in claim 10, wherein:

first aperture means is formed in said tubular support elements intermediate the extremities thereof and is aligned with said locking aperture means of said second chassis means in the contracted condition of said trailer mechanism; and second aperture means is formed in said tubular support elements adjacent one of the extremities thereof and is aligned with said locking aperture means of said second chassis means in the extended condition of said trailer mechanism.

12. An extensible trailer mechanism as recited in claim 11, wherein:

said tubular support elements prevent articulation of said first and second chassis means in the contracted condition of said trailer mechanism and allow articulation of said first and second chassis means in the extended condition of said trailer mechanism.

* * * * *